United States Patent Office 2,825,700
Patented Mar. 4, 1958

2,825,700

CATALYST FOR REFORMING LOWER HYDROCARBONS FORMULATION SUITABLE FOR EXTRUSION OF SAME

Kenneth D. Ashley and William B. Innes, Stamford, Conn., assignors to American Cyanamid Company, New York, N. Y., a corporation of Maine No Drawing. Application June 8, 1953
Serial No. 360,376

6 Claims. (Cl. 252—459)

The present invention relates to improvements in the preparation of an active nickel catalyst to be used primarily in the reforming of lower hydrocarbons with steam for the production of hydrogen and carbon oxides therefrom.

It has hitherto been proposed to make such nickel catalysts by reacting a nickel salt solution with an alkaline material, such as aqueous soda ash, to precipitate basic nickel carbonate. This precipitate is filtered off and then may be inter-mixed with a suitable carrier or mixture of carriers, such as china clay or kaolin, magnesia, wood flour, $\alpha$-cellulose, celite, or the like, and calcined, whereby a dry ignition mix is obtained. This dry calcined mix may then finally be inter-mixed with a suitable binder such as a hydraulic cement (Lumnite or Portland), water, and a mold lubricant, and then formed into pellets by a press or similar device.

Such a process produces a catalyst which is geometrically well-shaped, possesses low loss on ignition, has good catalytic stability and activity and, in general, exhibits sufficient advantageous characteristics to render it acceptable to the industry. However, the crush strength of the catalyst, although sufficiently high to meet the usual specifications, could desirably be higher, particularly where the catalyst is subject to disintegration or fracture resulting from rough handling such as during shipment or when loading in the catalyst tubes or in actual use. Additionally, the activity and stability of the catalyst, although acceptable, could always be improved in the interests of economy and efficiency.

It is, therefore, a principal object of the present invention to prepare an improved nickel catalyst suitable for use in the reforming of lower hydrocarbons, and particularly methane, with steam at temperatures of 400° to 1000° C. which catalyst possesses higher activity and stability, is more rugged and possesses greater crush strength characteristics than prior catalysts without suffering the loss of other desirable properties.

Additionally, another commercial difficulty in the preparation of such prior art catalysts has existed in the fabrication of the mix into the desired form as used by the industry. This formation or shaping has normally comprised a pelleting process and the high abrasive action of the pelleting mix on the molds and dies has shortened their effective serviceable life and has undesirably increased the operating costs of manufacture. Such an abrasive factor is particularly notable when the catalyst is fabricated in the form of Raschig rings which are hollow cylinders normally or approximately the same length as outside diameter and having thin walls as the nature of the materials permit.

Efforts to use such mixes in more economical processes having greater productive capacity, such as an extrusion process, have not been too successful inasmuch as, in addition to the undesirable abrasive effect, the mix just could not be made plastic enough and would extrude only with difficulty.

It is, therefore, a further principal object of the present invention to provide a catalyst mix which is less abrasive than prior art mixes and which will also lend itself to more economical extrusion processes whereby forming and other operating costs of manufacture will be reduced.

These objects and others which will appear hereinafter are provided by using a catalyst mix comprising a basic nickel carbonate filter cake in which is directly incorporated sufficient quantities of a dry mix comprising such materials as a hydraulic binding agent or cement (Lumnite or Portland), without any prior calcination of the basic nickel carbonate filter cake. To this composition may be added, as desired or required, components such as kaolin, magnesia, celite, $\alpha$-cellulose, wood flour or other suitable carriers or mixtures of such carriers for the nickel; or a portion of a calcined ignition mix or rework catalyst, whereby a higher percentage of nickel is incorporated in the catalyst. As a result of such additions, the consistency of the resulting mixture becomes such as to permit the extrusion thereof into the desired commercial form, such as Raschig rings. After extrusion, the product may be aged and dried, if desired, and then screened and packaged, as required for commercial use.

The basic nickel carbonate filter cake may be prepared by several methods, but for the purposes of this invention the preferred form is by its precipitation from a solution of a suitable nickel salt, such as nickel nitrate hexahydrate, by the addition thereto of an alkali, such as soda ash, followed by filtration and washing to remove all traces of the alkali.

The following general example is given to illustrate such a preparation but it should be understood that, although this example may set forth in detail some of the more specific details of the invention, it is given primarily for purposes of illustration and the invention in its broader aspects is not to be construed as limited thereto.

740 pounds of nickel nitrate hexahydrate (nickel content in excess of 19.5% as Ni; substantially C. P.; 0.003% Cu; 0.12% Co) was added to approximately 400 gallons water in a tank equipped with an agitator. The solution was agitated during the addition of the nickel nitrate and was heated to and maintained at about 60° C. until all the nickel nitrate was in solution.

Approximately 284 gallons of water was added to a separate tank also equipped with an agitator and 287 pounds of soda ash (99% min $Na_2CO_3$) was added thereto with agitation until all of the soda ash was dissolved.

The soda ash solution was then pumped over into the nickel nitrate solution which was kept in a state of constant agitation during the addition. The pH of the slurry containing the precipitated basic nickel carbonate was in the range 7.1–7.5. This slurry was then pumped from the precipitation tank to a filter press and washed for several hours or overnight at about 40–50 pounds line pressure (ca. 15 displacements). The feed lines were then shut off and the press was blown with air for approximately 30 minutes. The filter press cake was then ready to be mixed with sufficient quantities of a dry mix containing a hydraulic binding agent whereby the consistency of the resulting mixture becomes such as to permit its use in an extrusion process.

It is preferable that the intermixing with the dry mix take place when the filter cake is in a freshly precipitated form inasmuch as, in such a case, it is much easier to get it dispersed more properly in a more intimate mixture. Such a procedure also avoids the possibility of caking and drying out and provides a more plastic mixture capable of making a thinner and better slurry which will extrude easier.

Any desirable hydraulic binding agent or cement may be used, such as those which contain about 10 percent or more of an alkaline earth metal oxide. Alumina cements have also been found to be very satisfactory. Lumnite, which contains calcium aluminate as its primary constituent, is particularly desirable where high activity is desired for low temperature conditions such as would be required for ammonia synthesis. Portland cement, or its equivalent, would be desirable where greater resistance to decrepitation is necessary or where moderate activity is required for higher temperature conditions such as would be required for the production of methanol. Preferably about 65 to 87 parts by weight of cement are used for each 35 to 13 parts of basic nickel carbonate in the filter cake.

Without being bound to any particular theory or reasons for the advantages and benefits accruing from the direct blending of the uncalcined basic nickel carbonate filter cake and the hydraulic binding agent, it may be stated that the latter acts as a promoter for the former, whereby increased catalyst activity is obtained. This increase of activity is particularly notable when Lumnite cement is used and, to a lesser degree, when Portland cement or its equivalent is used.

In some cases, such as when a higher percentage of nickel is desired or required in the finished catalyst, small amounts of calcined filter cake materials ("ignition mix") and/or recovered and reworked nickel catalyst may be added to the dry hydraulic cement mix. The amount of the added ignition mix or rework catalyst may be on the order of from less than 1% up to about 50% or more as based on the total weight of the dry materials.

Previously-formed ignition mix may be used or, if desired, a portion of the filter cake obtained as described above may be separated and further processed to prepare such an ignition mix.

An example of such a preparation of ignition mix (which will also serve to further define such a term) is as follows: 490 pounds of nickel nitrate hexahydrate is dissolved with agitation and heating, if necessary, in approximately 200 gallons of water. 100 gallons of this solution is then added slowly over a period of 15–20 minutes to the separated portion (about 580 pounds) of the filter cake in a suitable mixing device, such as a ribbon mixer.

When the mix is homogeneous, a sufficient amount of a suitable extender or support, such as about 216 pounds of kaolin and about 60 pounds of magnesia, is slowly added with mixing to insure continued homogeneity of the mix. Additional magnesia may be added in an amount of about 33 lbs. with further continuous intermixing. The resulting homogeneous nickel paste is then placed in suitable containers and dried for several hours or overnight at about 70° C.

The dried filter cake is then loaded into a calciner which is maintained at approximately 300° C. and heated for about 2 hours to remove free moisture, followed by calcining at about 600° C. for about 3 hours or until the nitre fumes have ceased evolving. The calcined material is then removed and cooled in storage containers.

The proportion of the ignition mix may be varied within wide limits and the following proportions are given to exemplify some possible ranges:

| Component: | Parts by weight |
| --- | --- |
| Filter cake (basic nickel carbonate) | 150–750 |
| Water | 200–800 |
| Nickel nitrate hexahydrate | 50–300 |
| Kaolin, magnesia, celite, α-cellulose, wood flour, etc. | 0–300 |

This ignition mix may then be used as a constituent of the dry mix which is to be incorporated with the uncalcined basic nickel carbonate filter cake to provide a desired or required nickel content and to bring about the necessary consistency for proper extrudability.

The addition of the reworked nickel catalyst is a much simpler proposition and such an addition is made primarily in the interests of economy and efficiency in cases rework catalyst is readily available. Such rework catalyst is, of course, pulverized and is preferably in a degree of fineness approximately equal to −40 mesh.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

To 11 pounds of basic nickel carbonate filter cake (prepared as described hereinbefore from a nickel nitrate solution and soda ash) and 4.5 pounds of water was added a dry mix comprising 14 pounds of an ignition mix (prepared substantially as described hereinbefore), 9.5 pounds of Lumnite cement, 0.3 pound of graphite (Dixon 635), 2.7 pounds of magnesia and 2.7 pounds of clay. These materials were thoroughly intermixed in a pug mill over a period of approximately 50 minutes. The formulation was aged for 75 minutes and was sufficiently plastic to be easily extruded at an extrusion rate of 140–160 pounds per hour at a torque gage reading of 20–25. The product was extruded through a 2″ extruder in the form of Raschig rings which held together very well and showed practically no signs of cracking. A test of the crush strength of six samples having an average length of ¾″ indicated an average crush strength of well over 70 pounds (20 days aging and drying). The bulk density was determined to average 0.86 gram per cc. and the surface area was found to be approximately 50 m.$^2$/gram (1 hour at 1380° F., air). The piece density was approximately 1.71 g./cc.

A sample of the Lumnite cement used in Example 1 was analyzed and was found to have the following specifications:

| | Percent |
| --- | --- |
| $SiO_2$ | 9.0 |
| FeO | 5.9 |
| $Fe_2O_3$ | 5.6 |
| $Al_2O_3 + TiO_2$ | 41.0 |
| CaO | 37.0 |
| MgO | 1.1 |
| $SO_3$ | 0.2 |
| Insol. residue | 0.6 |
| Fineness | <5+200 mesh |

*Example 2*

To 11 pounds of basic nickel carbonate filter cake and 8.5 pounds of water was added a dry mix comprising 15 pounds of ignition mix, 12 pounds of Lumnite cement, 2.5 pounds of magnesia, 1 pound of catalyst rework, 1.5 pounds of α-cellulose, 0.5 pound of graphite, and 2.75 pounds of clay. A pug time of 30 minutes was employed and the resulting mixture was aged 90 minutes and then extruded. The extrusion was carried out slowly at the rate of about 70 pounds of mix per hour at a torque gage reading of 38–40. The crush strength, after 11 days aging and drying, was found to be about 104.5 pounds. The piece density was approximately 1.53 g./cc.

*Example 3*

To 13.5 pounds of an alumina-promoted nickel carbonate filter cake and 200 ml. of water were added 7.8 pounds of Lumnite cement, 5.6 pounds of magnesia, 1.12 pounds of celite, 4.46 pounds of clay and 0.2 pound of graphite. A pug time of 1 hour was employed and the aging time was 2 hours. The extrusion of the rings was at a rate of 160–180 pounds per hour at a torque gage reading of 45. The extruded product possessed extremely smooth surfaces and had a crushing strength of just under 70 pounds (19 days). Due to the absence of the ignition mix, the nickel oxide content (after a calcination at 1000° C.) was determined to be approximately 9%, whereas in the preceding examples using the ignition mix, the nickel oxide content was up to 17-21%. The crush strength of 8 sample rings, 0.8" long, was found to be over 66 pounds, after aging and drying. The piece density was approximately 1.63 g./cc.

Example 4

The following formulation was used:

| | Pounds |
|---|---|
| Filter cake | 25.0 |
| Rework catalyst | 6.0 |
| Lumnite cement | 12.0 |
| Magnesia | 4.0 |
| Clay | 4.5 |

The pug time was 30 minutes, the age of the mix when extruded into rings was 105 minutes and the extrusion rate was over 120 pounds per hour at a gage reading of 20-30. There was little cracking in the extruded ring and the crush strength, after 12 days of aging and drying, was over 80 lbs.

The formulation set forth in Example 4 was repeated, except that the 4.5 pounds of clay were omitted. A satisfactory product was obtained although it was noted that the extrusion did not proceed as smoothly as it did when the clay was present.

Example 5

The following formulation was used:

| | Pounds |
|---|---|
| Filter cake | 13.5 |
| Lumnite cement | 7.0 |
| Magnesia | 5.0 |
| Celite | 1.0 |
| Graphite | 0.2 |
| Clay | 4.0 |

The pug time was approximately 50 minutes and the age of the mix at extrusion was 5 hours. The extrusion proceeded very easily at a torque gage reading of 40. The crush strength of the rings (after aging and drying) was in the range 70-80 pounds.

Example 6

The following formulation was used:

| | Pounds |
|---|---|
| Filter cake | 5.5 |
| Water | 2.5 |
| Ignition mix | 7.5 |
| Portland cement | 5.0 |
| Magnesia | 1.5 |
| Graphite | 0.2 |
| Fire clay | 1.5 |

The pug time was 75 minutes and the mix was aged 105 minutes. The extrusion was performed slowly at a torque gage reading of 15. The extruded products were satisfactory, although a little wet.

Example 7

The following formulation was used:

| | Pounds |
|---|---|
| Filter cake | 11.0 |
| Water | 4.5 |
| Ignition mix | 15.0 |
| Atlas white Portland cement | 10.0 |
| Magnesia | 3.0 |
| Graphite | 0.3 |

The pug time was approximately 45 minutes and the extrusion took place at a rate of 160 pounds per hour and a torque reading of 20-25. The extrusion was good and the product easily met all required specifications.

A sample of the Atlas white Portland cement used in Example 7 was analyzed and was found to have the following specifications:

| | Percent |
|---|---|
| $SiO_2$ | 23.0 |
| $Fe_2O_3$ | 0.4 |
| $Al_2O_3$ | 4.0 |
| $CaO$ | 66.0 |
| $MgO$ | 1.5 |
| $SO_3$ | 1.5 |
| Residue | 3.6 |

Example 8

The following formulation was used:

| | Pounds |
|---|---|
| Filter cake | 17 |
| Lumnite cement | 34 |
| Graphite | 0.2 |

The pug time was approximately 45 minutes and, after an aging of 2 hours, the mixture extruded well into products which showed little cracking. The product was in the low range of nickel oxide content and averaged 8-9%. The crush strength was satisfactory.

Example 9

The following formulation was used:

| | Grams |
|---|---|
| Filter cake | 560 |
| Lumnite cement | 764 |
| Graphite | 30 |

With this formulation as in several of the previously-described formulations, it was noted that the Lumnite cement reacted with the water in the filter cake, if permitted to stay too long in contact therewith and, consequently, after the material had aged for approximately 15 minutes, it was necessary for a small amount, approximately 30 cc., of water to be added to create the proper consistency for extrusion.

Two further formulations were then tried, (1) in which the amount of Lumnite cement added was reduced to about 660 parts by weight and (2) in which the amount of Lumnite was raised as high as 940 parts by weight. An extrudable mixture was still obtained, provided water was added, if necessary, due to increased contact of the Lumnite cement with water, to bring about the desired water:dry mix ratio, whereby the proper extrusion consistency was obtained.

It has been found that the ratio of filter cake to dry mix should be on the order of from about 1:0.9 up to about 1:2.2, depending on the particular constituents used in the formulation, in order to obtain a mix suitable for extrusion. Higher quantities of filter cake would tend to render the mix too "soupy" for proper extrusion leading to poor extrusion rates, whereas higher quantities of dry mix would tend to make the mix too dry for proper extrusion leading to an imperfectly-formed product. However, higher quantities of a dry mix could successfully still be used, if small amounts of water were added to obtain the proper formulation consistency.

The ratio, therefore, of the water content of the filter cake plus the added water, if any, to the amount of total dry materials is more indicative of the desired formulation and the following is therefore set forth to more properly define the invention. The normal filter cake generally contains approximately 75% water and 25% dry materials and the amount of water therein can be calculated. This amount, plus the amount of added water, if any, should be that required to provide a water: total dry materials from about 1:1.2 to about 1:4.0 or, expressing it otherwise, one part by weight of free, uncombined water should be present for every 1.2-4.0 parts by weight of total dry materials, the ratio depending to a great extent on the ability of the dry materials to absorb and chemically react with water.

In order to illustrate the derivation and application of these values, the following illustrative examples are described. In Example 1, the 11 pounds of filter cake contain 75% water or 8.3 pounds of water to which was added 4.5 pounds of water to yield a total of 12.8 pounds of water. The dry materials included 2.7 pounds (25% of the 11-pound filter cake) and 29.2 pounds of other dry materials. The water:total dry materials ratio was therefore 12.8:29.2, or 1:2.48. In Example 9, the 560 grams of filter cake contained 75% water or 420 grams of water to which was added 30 grams of additional water to total 450 grams. The dry materials equalled 140 grams (25% of the filter cake) plus 764 grams of dry hydraulic cement or a total of 904 grams. This yielded a water:dry ratio of 450:904 or 1:2.01.

As a general rule, the consistency of the extrusion formulation should be such that when it is held between the fingers, it should be just on the verge of crumbling and, when held in the palm of the hand and squeezed, it should not adhere to the palm.

These specifications and properties are to be contrasted to the specifications and properties of the prior and pelleted catalysts:

(1) Chemical analysis (percent by weight ignited basis):

| | |
|---|---|
| L. O. I (1000° C.) | 14–17 |
| NiO | 19–23 |
| $Fe_2O_3$ | 5–7 |
| $Al_2O_3$ | 27–33 |
| CaO | 11–15 |
| $SiO_2$ | 17 |
| $SO_3$ | 0.4 |
| MgO | 12.0 |

(2) Physical properties:

| | |
|---|---|
| Crush strength, lbs | 30–50 |
| Bulk density lbs./cu. ft | 52–59 |
| Surface area m.²/gm. (1 hr. at 1380° F.) | 20 |

(3) Catalytic efficiency:
   775° C. for 0.3% methane in exit gas.

A comparison of the two types of catalysts was made by determining the percent methane in the exit gas under the following conditions: space velocity 600/hr.; atmospheric pressure; 96% methane; 4:1 steam:methane ratio; temperature 735° C.±5° C. The extruded catalyst showed from about 0.2 to about 1.4% methane, whereas the pelleted catalyst showed from about 1.1 to about 2.0% methane.

Although particular temperatures of reaction have been set forth hereinabove, as well as specific ratios of steam to methane, it is to be appreciated that the improved nickel catalysts of the present invention are suitable for the reforming of lower hydrocarbons in general in vaporized or vaporous form and that the temperatures of reaction may vary from as low as 400° C. to about 1000° C. depending on the nature of the particular circumstances involved and that various steam to lower hydrocarbon ratios may be employed.

Although we have described but a few specific examples of our invention, we consider the case not to be limited thereby to the specific substances mentioned therein, but to include various other equivalent compounds of similar constitution as set forth in the claims appended hereto. It is understood that any suitable changes or variations may be made without departing from the spirit or scope of the inventive concept.

We claim:

1. A process for preparing a nickel catalyst of improved crush strength for reforming lower hydrocarbons with steam which comprises preparing a hydrated mixture of basic nickel carbonate filter cake and a hydraulic cement containing at least 10% of an alkaline earth metal oxide, said mixture containing on the dry basis about 65 to 87 parts by weight of said cement for each 35 to 13 parts of basic nickel carbonate and from 1.2 to 4 parts by weight of solids for each part of water, aging said mixture to form an extrudable mass and extruding the mixture and aging the extruded mass to harden the cement.

2. A process according to claim 1 wherein the filter cake is in freshly precipitated form.

3. A process for preparing a nickel catalyst of improved crush strength for reforming lower hydrocarbons with steam which comprises preparing a hydrated mixture of basic nickel carbonate filter cake with a dry mix comprising a hydraulic cement having a content of at least 10% of an alkaline earth metal oxide and an ignition mix obtained by dehydrating and calcining a mixture of basic nickel carbonate and nickel nitrate, said hydrated mixture containing on the dry basis about 65 to 87 parts by weight of said cement for each 35 to 13 parts of basic nickel carbonate in the filter cake and from 1.2 to 4 parts by weight of solids for each part of water and said ignition mix comprising not more than 50% of the dry weight of the composition, extruding the mixture and aging the extruded mass to harden the cement.

4. A process according to claim 3 wherein the ignition mix contains up to 300 parts by weight of an inert carrier for each 32 to 170 parts of nickel.

5. A nickel catalyst of improved crush strength for reforming lower hydrocarbons with steam obtained by preparing a hydrated mixture of basic nickel carbonate filter cake with a dry mix comprising a hydraulic cement having a content of at least 10% of an alkaline earth metal oxide and an ignition mix obtained by dehydrating and calcining a mixture of basic nickel carbonate and nickel nitrate, said hydrated mixture containing on the dry basis about 65 to 87 parts by weight of said cement for each 35 to 13 parts of basic nickel carbonate in the filter cake and from 1.2 to 4 parts by weight of solids for each part of water and said ignition mix comprising not more than 50% of the dry weight of the composition, extruding the mixture and aging the extruded mass to harden the cement.

6. A nickel catalyst according to claim 5 wherein the ignition mix contains up to 300 parts by weight of an inert carrier for each 32 to 170 parts of nickel.

References Cited in the file of this patent
UNITED STATES PATENTS 2,038,566   Huettner et al. ---------- Apr. 28, 1936